Aug. 1, 1961
W. N. MATSON
2,994,276
HIGH-SPEED CONSTANT FLOW ROTARY WORM GEAR PUMP
Filed Nov. 13, 1958
2 Sheets-Sheet 1
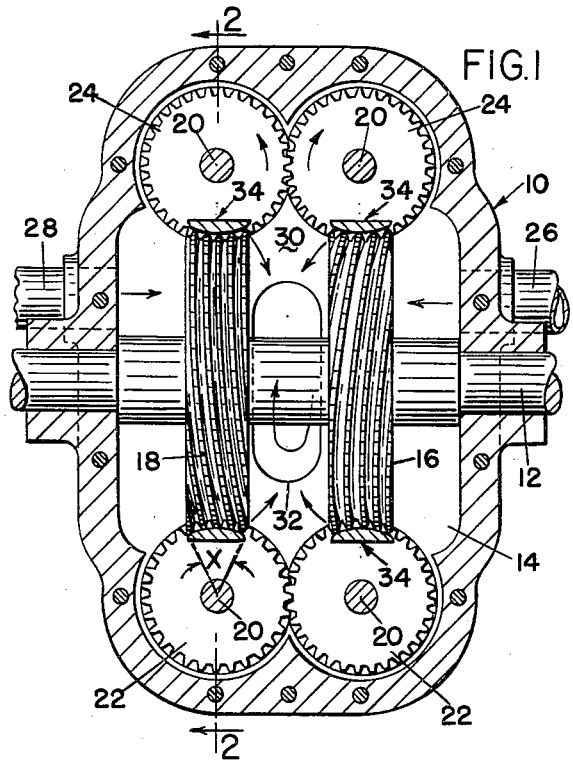
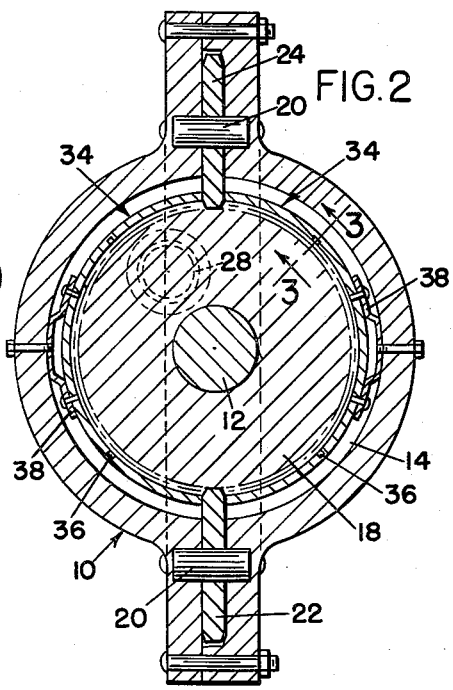
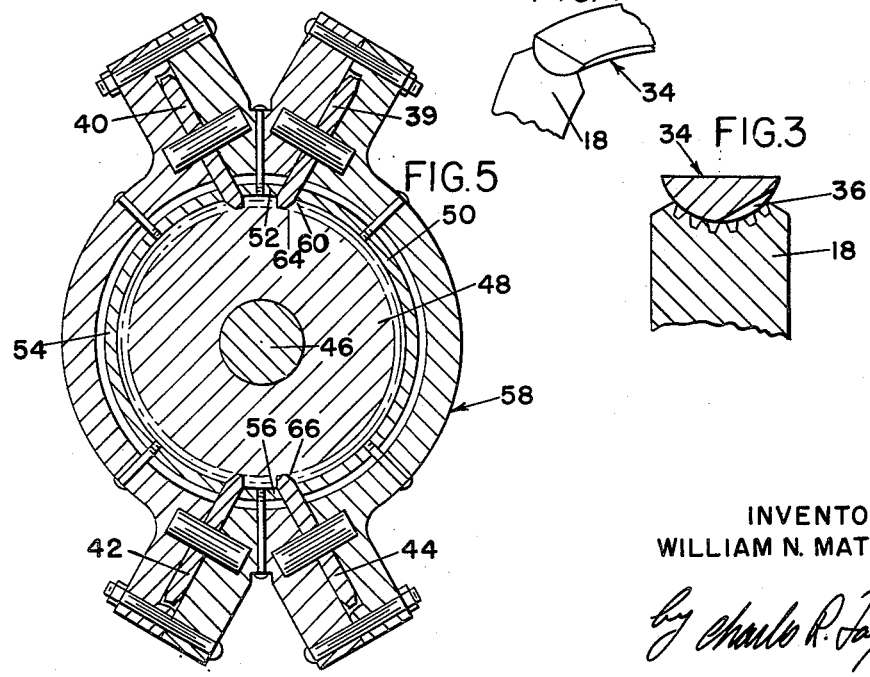
INVENTOR
WILLIAM N. MATSON
by Charles R. Fay
ATTORNEY Aug. 1, 1961   W. N. MATSON   2,994,276
HIGH-SPEED CONSTANT FLOW ROTARY WORM GEAR PUMP
Filed Nov. 13, 1958   2 Sheets-Sheet 2

INVENTOR
WILLIAM N. MATSON

ATTORNEY

United States Patent Office 2,994,276
Patented Aug. 1, 1961

2,994,276
HIGH-SPEED CONSTANT FLOW ROTARY WORM GEAR PUMP
William N. Matson, 560 Westminster Hill Road, Fitchburg, Mass.
Filed Nov. 13, 1958, Ser. No. 773,651
5 Claims. (Cl. 103—125)

The principal object of the present invention is the provision of a rotary worm gear pump which may be operated at very high speeds while maintaining a constant flow of fluid material being pumped; this pump is capable of extremely high speeds and may be made to occupy a relatively smaller space for the flow to be desired. The new pump is versatile in that it may be used in many different ways, depending upon requirements of pumping fluids; it eliminates reduction gears in many instances, and cuts down on noise and space requirements, upkeep, and also on initial cost.

The new pump also prevents any kind of cavitation, as the oil or fluid being pumped is not "sucked" into the gears as normally in gear pumps but the gears slice into the fluid; there is no loading on the idler gears as the forces are at right angles to the gear sides. The device can be inexpensively mass produced because it uses a generated worm gear.

Further objects of the invention include the provision of a pump of the class described including the provision of a central shaft driving a pair of complementary axially spaced worms which are in mesh with one or more idler gears, the idler gears in turn being in mesh with each other so that the wear is substantially axial on the sides of the gears and not on the teeth; by using the two worms, a balanced loading is provided and the pump contemplates the use of a pair of inlets, one on each side of the casing with an expelling portion at the central part of the casing between the two worms for balancing the thrust and preventing leakage which is kept at a minimum, because of reduced pressures on the inlet sides of the pump.

Other objects of the invention include the provision of a new and improved sealing ring construction for the worms; and the provision of the idler gears as a modification at an inclined and non-radial position with respect to the axis of the worms, so that there is no tendency of the gear teeth to try to compress the fluid being pumped, this tendency to compression resulting sometimes in breakage of the gears or warping of the shaft, etc., all of which is avoided by the present invention.

Other objects and advantages of the invention will appear hereinafter.

Reference is to be had to the accompanying drawings, in which—

Figure 6:
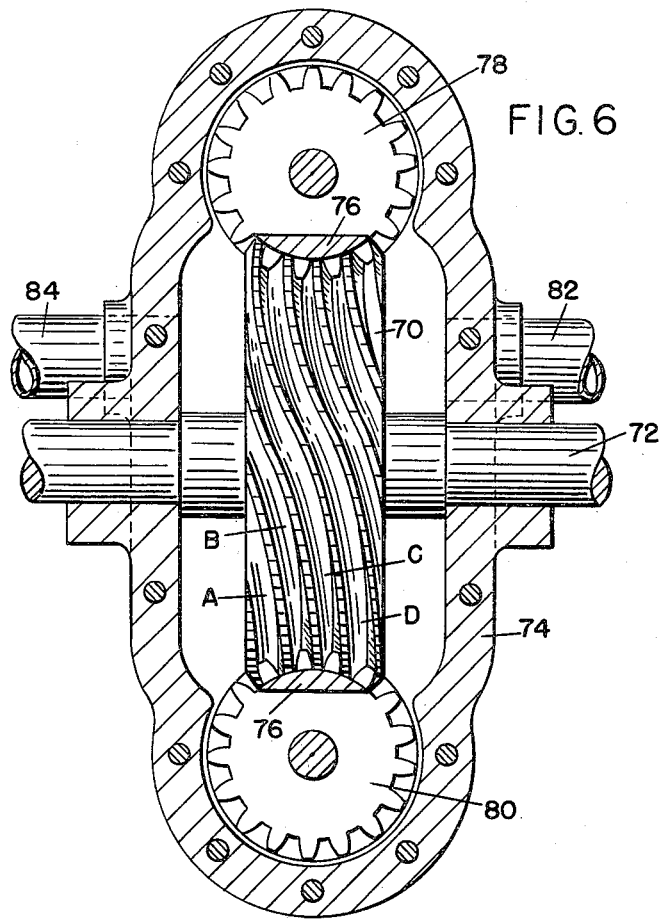
Figure 7:
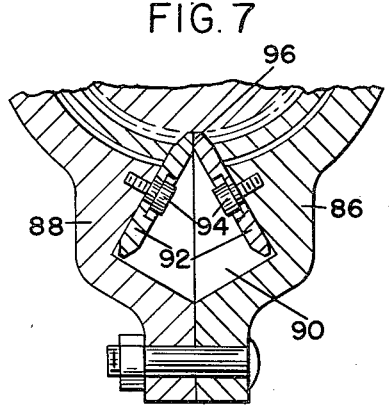

FIG. 1 is a sectional view through a gear casing illustrating one form of the invention;
FIG. 2 is a section on line 2—2 of FIG. 1;
FIG. 3 is an enlarged section on line 3—3 of FIG. 2;
FIG. 4 is a diagrammatic view illustrating how the seal operates;
FIG. 5 is a section similar to FIG. 2 and illustrating a modification wherein the idler gears are placed on a non-radial relationship with respect to the axis of the worm gears;
FIG. 6 is a section through a modified form of the invention; and
FIG. 7 is a section through a further modified form relating to the construction of FIG. 5.

In carrying out the present invention, there is provided a casing generally indicated at 10. This casing provides bearings for a main shaft 12 passing directly through a chamber 14 within the housing 10. The shaft 12 serves to rotate one or more of like worm gears which are indicated at 16 and 18, adjacent worms being of opposite hand.

Mounted on any kind of idler shafts as at 20, there are provided the necessary idler gears indicated at 22, 22 and 24, 24. The gears 24, 24 are in mesh as are the gears 22, 22 and it will be seen that these gears are rotated by the worms 16 and 18 in timed relation. The worms 16 and 18 are respectively right and left-hand in order to allow the idler gears to rotate in the respective directions shown.

The housing 10 provides for a pair of inlets which are indicated at 26 and 28 and these allow the oil or other fluid to be drawn into the portion of the chamber 14 which is exterior of the two worms 16 and 18, that is to the left of worm gear 18 and to the right of worm 16. The action of the pump is to draw the fluids in between the teeth of the respective worm gears and the idlers to the central chamber indicated at 30 and thence out the exit port or the like 32 as indicated by the direction of the arrows.

In order to maintain tightness about the worms 16 and 18, they are encompassed by curved sectors or keys in the form of bands or the like generally indicated at 34 and extending from gear-to-gear as best shown in FIG. 2. These may be provided with bleeding slots or grooves 36 which are relief grooves leading into the center portion of the pump to the outlet side. The reason for the provision of these relief grooves resides in the fact that the conformation of the worms may tend to cause increased pressure on the fluid as it is drawn in between the teeth and this is apt to cause damage if not relieved. Therefore the relief slots or grooves 36 provide for the passage of the fluid into the center part of the pump as described in order to relieve any possibility towards increased pressure between the teeth of the gears. The sectors 34 may be mounted directly in the housing or on brackets such as for instance are shown at 38 in FIG. 2.

Referring now to FIG. 5, there is shown a modification. This figure is similar to FIG. 2 but it will be observed that the idler gears as for instance at 39, 40, 42 and 44 are located non-radially with relation to the axis of the shaft 46 which is similar to that at 12. These gears are not parallel but, however, are still meshed with the worm gears constructed as at 16 and 18, the worm in FIG. 5, however, being indicated at 48. Sectors or keys at 50, 52, 54 and 56 are utilized as before and these are supported in any way desired in the housing which is generally indicated at 58.

The effect of this construction is to provide that the circumferential distance from a point at the crown of the worm teeth 60 to a similar point at the opposite end of the tooth is substantially the same distance as from a point at 64 to a point 66 at the base of the teeth. Obviously the circumferential distance of the teeth at the crown is ordinarily greater than the circumferential distance of the teeth at the roots but from gear 39 to gear 44 these distances are substantially equal due to the inclination of the idler gears. The same is true as to the relative distances between gear 40 and gear 42.

The reason for this construction resides in the fact mentioned above that there is some liability for the gear teeth to attempt to compress the fluid being pumped to the detriment of the machine but in the case of the showing in FIG. 5, there is no such tendency inasmuch as the application of the gear teeth of the worm 48 to the teeth of the idler gears, 39, 40, etc., is the same from top to bottom thereof and does not increase as is the case in the FIG. 2 construction, and therefore there is no tendency in FIG. 5 for this compressive effect. In the FIG. 5 construction, the relief slots 36 will not be needed.

Another advantage of the present invention resides in the fact that the angle X as shown in FIG. 1 may be kept very small as compared with worm gear pumps of the prior art, and this keeps the volumetric change at a minimum. A similar effect of course proportionately would result by making the idlers larger and the worm gear itself might be made even more narrow than is shown in FIG. 1.

By keeping the worm diameter smaller, the peripheral speeds are cut down and therefore a higher speed of rotation of the pump is possible than would otherwise be the case. The relief grooves 36 are more necessary of course where the worms 16 and 18 are made wider, and if these worms are made thin enough, no relief grooves 36 would usually be necessary.

The axial thrust on the pump and in fact all of the forces are balanced because the inlets are placed at the outside of the worms and the expulsion of the fluid is from the center of the pump. The leakage area around the shaft is therefore not under pressure and is therefore kept at a minimum.

The load on the idler gears is on the sides of the gears and is not on the teeth so that very little wear occurs. By placing the idler gears 180° apart as in FIG. 2, the bearing load is balanced out, assuring better performance and longer life. The length of continuous arc of any groove in the worm must somewhat exceed the circumferential spacing of the meshing teeth.

As to the worm gears themselves, the grooves forming the teeth on the periphery thereof are preferably made on a small angle relative to the side of the gear, and the filling of the groove by the fluid is continuous and gradual, allowing free access of fluid and preventing cavitation or formation of vacuum or region of reduced pressure. In contra-distinction to this, the conventional gear pump is filled at right angles or across the gear, and the action is instantaneous, rather than gradual, thereby causing cavitation and limiting the speed and efficiency of the pump.

The tooth angle of the worm should be as flat as possible for higher speeds. This may be determined by tooth size and the lead which may be single, double, triple, etc. The greater number of leads, the steeper the angle, and the greater the flow.

The pump can be made to run in either direction equally well merely by changing direction of rotation of the shaft. Of course the inlets and outlets will be reversed also. It is also to be realized that torque must be applied to the shaft to operate it. This arrangement of gears cannot move in a reverse direction except under power applied to the shaft, and there can be no reverse or backward running due to pressure build-up or power failure.

Referring now to FIG. 6, there is shown a form of the invention in which but a single worm 70 is utilized. This worm is driven by a shaft 72 mounted in a housing generally indicated at 74 as before, and the sectors or keys 76 may also be utilized in the same way as those at 34. The idlers at 78 and 80 operate more or less as previously described but in this case the flow is from one side of the gear 70 to the other, and the ports at 82 and 84 are respectively inlet or outlet, depending upon the direction of rotation of shaft 72. The single worm type of gear shown in FIG. 6 is less expensive to manufacture and in some applications, may operate as well as the double worm device shown in FIG. 1. It is also pointed out that of course the construction of FIG. 1 may utilize more worms than shown, and there may as a matter of fact be a series of same on the same shaft 12.

It is also pointed out that by varying the thickness of the gear 70 as well as those at 16 and 18 and changing the tooth contour such that the tooth is narrow and the groove is wide, the pump capacity may be increased and the capacity may be decreased by a variation as will be clear to those skilled in the art. These changes can be made by using the same physical sizes on the other parts and therefore it will be seen that the capacity of the pump may be made practically anything that is desired, and of course the speed may be extremely high in many instances particularly with respect to the form of pump shown in FIG. 1 and using the bleeder grooves at 36 or the form of the pump shown in FIG. 5, which does not need such grooves or slots.

In FIG. 7 there is shown a modification of the form of the invention shown in FIG. 5. In this case the housing may be made in two parts 86 and 88, these parts being complementary and being cut out as at 90 to form a single cavity on which the idler gears at 92 are conveniently mounted on shoulder nuts or the like 94. The teeth do not mesh with each other but the gears 92 may bear on each other as is indicated by the reference numeral 96. Otherwise the construction and operation of the modification of FIG. 7 is the same as that in FIG. 5.

In explaining further the operation of the novel pump in this case, attention is directed to FIG. 6. For example, the fluid may enter on the left side of the pump at 84 and when the pump rotates in the direction of the arrow in FIG. 6, the teeth on the worm actually slice into the fluid. The letters A, B, C and D show the position of the groove formed by the teeth on the worm in successive increments of turn of the worm. The groove gets longer and longer as the gear turns. When the maximum length of groove is attained, the idler gear on top goes into mesh with the groove on the worm. The idler then acts as a dam and the worm tooth unmeshes from the bottom and opens into the outlet side of the gear pump. The fluid is then forced out as the groove in the gear continues to shorten. The idler at the opposite end acts in the same manner for the other 180° of turn, giving two pumps in one. Minimum sector and tooth clearances are desirable for best results. The idler gears need have very little mass and have a speed at about ⅕ or ⅒ the speed of the worm gear.

Having thus described my invention and the advantages thereof, I do not wish to be limited to the details herein disclosed, otherwise than as set forth in the claims, but what I claim is:

1. A worm gear pump comprising a generally cylindrical casing, a central drive shaft extending longitudinally through said casing, axially spaced worm gears fixed to said shaft within said casing, one worm gear having a right hand thread and the other a left hand thread, said gears being disposed to provide a fluid outlet chamber between said gears and a fluid inlet chamber axially outwardly of each gear, an outlet port communicating with said outlet chamber, an inlet port communicating with each inlet chamber, a pair of idler gears meshing with one of said worm gears at diametrically opposite points and rotatably mounted in said casing, a second pair of idler gears meshing with the other of said worm gears at diametrically opposite points and with said first pair of idler gears and rotatably mounted in said casing, said idler gears serving to prevent communication between the thread grooves in the periphery on one side of said worm gears and the thread grooves in the periphery on the other side, sealing means between said inlet chambers and said outlet chamber comprising a pair of semi-circular bands engaging the thread crests of each of said worm gears for approximately one hundred and eighty degrees with the opposite ends of said bands engaging one side face of said idler gears at diametrically opposite locations and a second pair of semi-circular bands engaging the thread crests of each of said worm gears for approximately one hundred eighty degrees with the opposite ends of said second pair of bands engaging the axially opposite side face of said idler gears at diametrically opposite locations and means to secure each band to said casing comprising brackets disposed between said bands and said casing and secured to said bands and said casing to maintain said bands in engagement with the periphery of said worm gears, whereby upon rotation of said worm gears fluid will be carried in said thread grooves inwardly of said bands from said inlet chambers to said outlet chamber.

2. A worm gear pump as defined in claim 1, in which each band is provided with a plurality of circumferentially spaced transverse bleed slots in the surface contacting said worm gears, said slots extending from a point intermediate the width of the band and opening into said outlet chamber.

3. A worm gear pump as defined in claim 1, in which two pairs of idler gears mesh with each worm gear and with each other, the idler gears of one pair being disposed in divergent relationship with respect to the other pair meshing with the same worm gear and engaging the worm gear at circumferentially spaced points and sealing bands between said pairs of idler gears engaging the thread crests of said worm gears, said casing and the opposed side faces of said idler gears.

4. A worm gear pump comprising a generally cylindrical casing, a central drive shaft extending longitudinally through said casing, a worm gear fixed to said shaft within said casing, a fluid outlet chamber on one side of said gear, a fluid inlet chamber on the opposite side of said gear, ports communicating with said inlet and outlet chambers, a pair of idler gears meshing with said worm gear at diametrically opposite points and rotatably mounted in said casing, said idler gears serving to prevent communication between the thread grooves and the periphery on one side of said worm gear and the thread grooves in the periphery on the other side, sealing means between said inlet chamber and said outlet chamber comprising a semi-circular band engaging the thread crests of said worm gear for approximately one hundred eighty degrees with the opposite ends of said band engaging one side face of said idler gears at diametrically opposite locations and a second semi-circular band engaging the thread crests of said worm gear for approximately one hundred eighty degrees with the opposite ends of said second band engaging the axially opposite side face of said idler gears at diametrically opposite locations and means to secure each band to said casing comprising brackets disposed between said bands and said casing and secured to said bands and said casing to maintain said bands in engagement with the periphery of said worm gear, whereby upon rotation of said worm gear fluid will be carried in said thread grooves inwardly of said bands from said inlet chamber to said outlet chamber.

5. A worm gear pump as defined in claim 4, in which two pairs of idler gears mesh with said worm gear, the associated gears of each pair being disposed in divergent relationship and with the opposed side faces contacting adjacent the meshing engagement with said worm gear.

References Cited in the file of this patent

UNITED STATES PATENTS

| | | |
|---|---|---|
| 17,516 | Ramsden | June 9, 1857 |
| 711,083 | Taylor | Oct. 14, 1902 |
| 1,427,823 | Kerr | Sept. 5, 1922 |
| 1,437,464 | Carroll | Dec. 5, 1922 |
| 1,654,048 | Myers | Dec. 27, 1927 |
| 1,723,157 | Guttinger | Aug. 6, 1929 |
| 1,735,477 | Stuart | Nov. 12, 1929 |
| 1,791,047 | Symons | Feb. 3, 1931 |
| 1,946,097 | Morris et al. | Feb. 6, 1934 |
| 1,989,552 | Good | Jan. 29, 1935 |
| 2,158,933 | Good | May 16, 1939 |
| 2,402,805 | Cousino | June 25, 1946 |
| 2,716,861 | Goodyear | Sept. 6, 1955 |